(12) United States Patent
Okamoto et al.

(10) Patent No.: US 6,649,730 B2
(45) Date of Patent: Nov. 18, 2003

(54) AROMATIC POLYESTER AMIDE

(75) Inventors: Satoshi Okamoto, Ibaraki (JP);
Tomohiro Sato, Ibaraki (JP); Manabu Hirakawa, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/253,768

(22) Filed: Sep. 23, 2002

(65) Prior Publication Data
US 2003/0092875 A1 May 15, 2003

(30) Foreign Application Priority Data

Sep. 27, 2001 (JP) .......................... 2001-297815

(51) Int. Cl.[7] ............................................... C08G 63/00
(52) U.S. Cl. ..................... 528/184; 528/176; 528/185; 528/189; 528/193; 524/401
(58) Field of Search ................. 528/176, 184, 528/185, 189, 193; 524/401

(56) References Cited

U.S. PATENT DOCUMENTS 4,966,956 A   10/1990   Andreu et al.

FOREIGN PATENT DOCUMENTS

JP     02-086623 A     3/1990

*Primary Examiner*—Samuel A. Acquah
(74) *Attorney, Agent, or Firm*—Akin, Gump, Strauss, Hauer & Feld, L.L.P.

(57) ABSTRACT

The object of the present invention is to provide an aromatic polyester amide which has improved mechanical strength and high elastic modulus after being molded into a thin wall article as well as exhibits excellent heat stability and moldability. The present invention provides an aromatic polyester amide comprising the following repeating units (a)–(d):

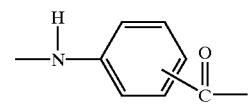

(a)

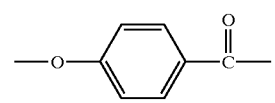

(b)

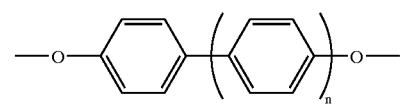

(c)

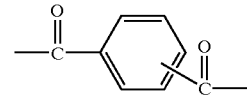

(d)

[wherein n in (c) represents 0 or 1]

wherein (a) is from 2 to 20 mole %, (b) is from 30 to 65 mole %, (c) is from 15 to 35 mole % and (d) is from 15 to 30 mole % provided that the sum of (a) to (d) is 100 mole %.

5 Claims, No Drawings

AROMATIC POLYESTER AMIDE

FIELD OF THE INVENTION

The present invention relates to an aromatic polyester amide.

BACKGROUND OF THE INVENTION

Thermotropic liquid crystalline polymers (LCPs) are used in various electric/electronic parts used in IT-related technology, including connectors, relays and coil bobbins, and IT-related market has been expanded. Since electric/electronic devices have been downsized, it is required to develop LCPs which have excellent mechanical properties (e.g., elastic modulus) so that molded products have enough strength even when the products are molded into thin wall articles. Although conventional LCPs (including various aromatic polyester and derivatives thereof) had high heat stability and moldability, they could not exhibit enough mechanical strength or elastic modulus after being molded into thin wall articles.

For example, Japanese Unexamined Patent Publication No. 2-86623 (of which U.S. application counterpart is U.S. Pat. No. 4,966,956) discloses an aromatic polyester amide obtained by reacting p-aminophenol, 4-hydroxybenzoic acid, 4,4'-dihydroxybiphenyl and terephthalic acid. However, the aromatic polyester amide had disadvantages that a thin wall article thereof could not exhibit sufficient mechanical strength or elastic modulus, and its heat stability is sometimes deteriorated.

SUMMARY OF THE INVENTION

An object of the present invention is to provide an aromatic polyester amide which has improved mechanical strength and elastic modulus even after being molded into a thin wall article while retaining its excellent properties such as high heat stability and moldability.

After intense studies to find an aromatic polyester amide which can overcome the aforementioned disadvantages, the present inventors developed the present invention based on the findings that an aromatic polyester amide comprising an aminobenzoic acid repeating unit, hydroxybenzoic acid repeating unit, dihydroxybiphenyl or hydroquinone repeating unit, and phthalic acid repeating unit may have improved mechanical strength and elastic modulus after being molded into a thin wall article while retaining its excellent properties such as high heat stability and moldability.

That is, the present invention is an aromatic polyester amide comprising the following repeating units (a)–(d):

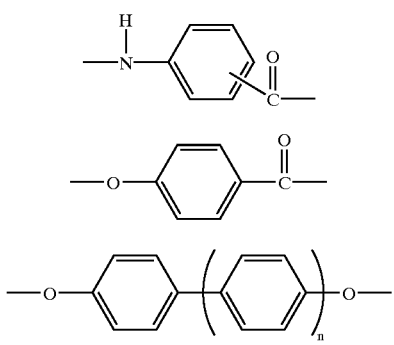

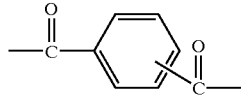

[wherein n in (c) represents 0 or 1]
wherein (a) is from 2 to 20% by mole, (b) is from 30 to 65% by mole, (c) is from 15 to 35% by mole and (d) is from 15 to 30% by mole provided that the sum of (a) to (d) is 100% by mole.

DETAILED DESCRIPTION OF THE INVENTION

An aromatic polyester amide according to the present invention exhibits an optical anisotropy when melted and comprises the following repeating units (a)–(d): (a) a repeating unit derived from an aminobenzoic acid; (b) a repeating unit derived from an hydroxybenzoic acid; (c) a repeating unit derived from a dihydroxybiphenyl or hydroquinone; and (d) a repeating unit derived from a phthalic acid.

Repeating unit (a) may be a repeating unit derived from, for example, p-aminobenzoic acid, m-aminobenzoic acid, carboxylate ester or carboxylic halide. Repeating unit (a) may be derived from one or more of the above compounds. Repeating unit (a) may preferably be derived from p-aminobenzoic acid.

Repeating unit (a) is present at an amount of 2–20% by mole, and preferably 5–15% by mole in the aromatic polyester amide of the present invention.

An aromatic polyester amide containing repeating unit (a) of less than 2% by mole may exhibit reduced elastic modulus. On the other hand, one containing repeating unit (a) of more than 20% by mole may not be polymerized enough to have a high molecular weight since it sometimes hard to stir polymerization reaction solution due to drastic increase in its melt viscosity.

Repeating unit (b) may be a repeating unit derived from, for example, p-hydroxybenzoic acid, carboxylate ester, carboxylic halide or p-acetoxybenzoic acid. Repeating unit (b) may be derived from one or more of the above compounds. Repeating unit (b) may preferably be derived from p-hydroxybenzoic acid alone.

Repeating unit (b) is present at an amount of 30–65% by mole, and preferably 40–60% by mole in the aromatic polyester amide. An aromatic polyester amide contains repeating unit (b) of less than 30% by mole or of more than 65% by mole, the article obtained from the polymer may have a reduced bending modulus.

Repeating unit (c) may be a repeating unit derived from, for example, 4,4'-dihydroxybiphenyl, 4,4'-diacetoxybiphenyl, hydroquinone, or diacetoxy hydroquinone. Repeating unit (c) may be derived from one or more of the above compounds. Repeating unit (c) may preferably be derived from a 4,4'-dihydroxybiphenyl or hydroquinone, or from 4,4'-dihydroxybiphenyl and hydroquinone. Particularly, repeating unit (c) may preferably be derived from 4,4'-dihydroxybiphenyl alone.

Repeating unit (c) is present at an amount of 15–35% by mole, and preferably 20–30% by mole in the aromatic polyester amide. When an aromatic polyester amide contains a repeating unit (c) of less than 15% by mole or of more than 35% by mole, the article obtained from the polymer may have a reduced bending modulus.

Repeating unit (d) may be a repeating unit derived from, for example, terephthalic acid or isophthalic acid, dicarboxylate ester or dicarboxylic halide. Repeating unit (d) may be derived from one or more of the above compounds. Repeating unit (d) may preferably be derived from terephthalic acid or isophthalic acid, or from terephthalic acid and isophthalic acid. Particularly, repeating unit (d) may preferably be derived from terephthalic acid and isophthalic acid. In this case, the ratio of terephthalic acid to the total amount of terephthalic acid and isophtalic acid may preferably be present at an amount of 70% by mole or more.

Repeating unit (d) is typically present at an amount of 15–30% by mole, and preferably 20–25% by mole in the aromatic polyester amide. When an aromatic polyester amide contains repeating unit (c) of less than 15% by mole or of more than 30% by mole, the article obtained from the polymer may have a reduced bending modulus and fluidity.

The amounts of repeating units (a)–(d) may be appropriately selected within the respective ranges described above and the sum of them is equal to 100% by mole.

Aromatic polyester amides according to the present invention are produced by any conventionally known method involving polyester or polyester amide polycondensation reaction. Such polycondensation reaction may be performed in the presence or absence of catalyst.

Initial flowing temperature for an aromatic polyester amide according to the present invention may be 250–420° C., and preferably 300–400° C.

The term "initial flowing temperature" means a temperature at which the molten polymer exhibits a viscosity of 4800 Pa when it is extruded through the nozzle of a capillary rheometer equipped with a die (inner diameter=1 mm, length=10 mm) at a heating rate of 4° C./minute under a load of 100 kg/cm$^2$ (9.807 MPa).

Aromatic polyester amides according to the present invention may be mixed with an inorganic filler to produce aromatic polyester amide compositions.

Examples of inorganic filler include: inorganic fillers such as glass fibers (e.g., milled glass fiber or chopped glass fiber), glass beads, hollow glass spheres, glass powder, mica, talc, clay, silica, alumina, potassium titanate, wollastonite, calcium carbonate, magnesium carbonate, sodium sulfate, calcium sulfate, barium sulfate, calcium sulfite, aluminum hydroxide, magnesium hydroxide, calcium hydroxide, calcium silicate, silica sand, silica brick, quartz, titanium oxide, zinc oxide, iron oxide graphite, molybdenum, asbestos, silica alumina fiber, alumina fiber, plaster fiber, carbon fiber, carbon black, white carbon, diatomaceous earth, bentonite, sericite, sillas or graphite; metal whiskers (e.g., potassium titanate whisker, alumina whisker, aluminum borate whisker, silicon carbide whisker or silicon nitride whisker); and non-metal whiskers.

Inorganic fillers may be used alone or in combination. Among all, glass fiber, glass powder, mica, talc and carbon fiber may preferably be used.

The content of inorganic filler may be from 5 to 50% by weight to 100% by weight of a total amount of an aromatic polyester amide and inorganic filler.

Inorganic fillers may be subjected to any suitable surface-treatment. For example, surface-treatment agents may be adsorbed onto the surface of inorganic fillers or surface-treatment agents may be mixed with inorganic filler and the resulted mixture is kneaded together with an aromatic polyester amide.

Examples of surface-treatment agent include reactive coupling agents such as silane coupling agent, titanate coupling agent or borane coupling agent, and lubricants such as higher fatty acid, higher fatty ester, higher fatty acid metal salt, or fluorocarbon surfactant.

Aromatic polyester amide resin composition may additionally be blended with any additive. Such additives include a mold releasing agent such as fluorine resin, other resin, anti-oxidant, color-protecting agent, stabilizing agent, ultraviolet absorbing agent, plasticizer, fire retardant and the like.

Examples of other resin include, for example, thermoplastic resins such as polycarbonate, polyester, polyamide, polysulfone, polyphenylene sulfide, polyether ketone, polyether sulfone or polyetherimide, and thermosetting resins such as phenol resin, epoxy resin or polyimide resin.

An aromatic polyester amide resin composition may be obtained by mixing an aromatic polyester amide with inorganic filler, and optionally with any one or more of the above additives, if necessary, according to any conventional method. For example, aromatic polyester amide and inorganic filler may be separately supplied into a melt-kneader, or those may be pre-mixed in a mortar, or by using Henschel mixer, ball mill or ribbon blender, and then supplied into a melt-kneader.

The aromatic polyester amide resin compositions of the present invention are preferable used for injection-molding to produce, for example: electric/electronic parts such as computer-associated parts including connectors, sockets, relay parts, coil bobbins, light pickups, oscillators or printed-wiring boards; semiconductor manufacturing process-associated parts such as IC trays and wafer carriers; parts used in household electric appliances such as VTRs, TVs, electric irons, air conditioners, stereos, vacuum cleaners, refrigerators, electric rice cookers or illuminations; illumination parts such as lamp reflectors or lamp holders; sound system-associated products such as compact disks, laser disks or speakers; parts used in telecommunication devices such as ferrules for optical cables, telephones, facsimiles or modems; copying or printing machine parts such as separation claws or heater holders; machine parts such as impellers, fan gears, bearings, motor parts and casings; automobile parts such as mechanical parts, engine parts, inner parts of engine room, electric equipment or interior parts; parts for cooking tools such as pans which can be used in a microwave oven or heat-resistant tableware; and parts used in airplane, spacecraft or space satellite.

EXAMPLES

Hereinafter, the present invention will be described in reference to the following examples though the present invention will not be limited to these examples.

Test pieces obtained in examples and comparative examples described below were evaluated according to the following methods:

(1) Tensile Strength

Dumbbell-shaped thick test pieces (JIS K7113 2) and dumbbell-shaped thin test pieces (JIS K7113 1(1/2)) obtained in examples and comparative examples were subjected to tensile test according to ASTM D638.

(2) Flexural Strength and Flexural Modulus

Rectangular thick test pieces (12.7 mm×6.4 mm×127 mm) and parallel portions (width=5 mm) of dumbbell-shaped thin test pieces (JIS K7113 1(1/2)) obtained in examples and comparative examples were subjected to flexural test according to ASTM D790.

Example 1

To a container equipped with a reflux condenser, a thermometer, a nitrogen inlet pipe and a stirrer were added 75.4 g (5% by mole) of p-aminobenzoic acid, 683.7 g (45% by mole) of p-hydroxybenzoic acid, 512.1 g (25% by mole) of 4,4'-dihydroxybiphenyl, 434 g (23.75% by mole) of terephthalic acid, 22.8 g (1.25% by mole) of isophthalic acid and 1,235.3 g (110% by mole) of acetic anhydride. The mixture was then heated to about 150° C. and stirred under reflux for 3 hours. Next, the mixture was heated to about 320° C. while removing acetic acid by evaporation, and kept at about 320° C. for additional 1 hour to obtain pre-polymer.

The resultant pre-polymer was cooled, crushed in a grinder, and heated in a hot-air circulating oven under nitrogen atmosphere so that the temperature of gas phase in the oven reached to 230° C. Further, the temperature was heated to 320° C. from 230° C. over 5 hours and kept at 320° C. for 3 hours to obtain polyester amide having an initial flowing temperature of 385° C.

The resultant aromatic polyester amide (60 parts by weight) was mixed with milled glass fiber (REV-8, available from Nippon Sheet Glass Co., Ltd.) (40 parts by weight) and the mixture was granulated in a two-axle extruder (PCM-30 type, available from Ikegai Corporation) using a cylinder temperature of 390° C. to obtain pellet.

The pellet obtained was dried at 120° C. for 3 hours, and injection-molded in an extruder (PS40E5ASE type, available from Nissei Plastic Industrial Co., Ltd.) using a cylinder temperature of 400° C. and a mould temperature of 130° C. to obtain dumbbell-shaped thick test pieces (JIS K7113 2), dumbbell-shaped thin test pieces (JIS K7113 2(1/2)), and rectangular (12.7 mm×6.4 mm×127 mm) test pieces. Those pieces were tested for tensile and flexural strength according to the above-described methods. The results are shown in Table 1 below.

Examples 2–4 and Comparative Examples 1–5

The procedure described in example 1 was repeated except for using aromatic polyester amides or aromatic polyesters obtained by using p-aminobenzoic acid, p-aminophenol, p-hydroxybenzoic acid, 4,4'-dihydroxybiphenyl, terephthalic acid and isophthalic acid at the amounts shown in Table 1, respectively, to obtain test pieces. Those pieces were tested for tensile and flexural strength according to the above-described methods. The results are shown in Table 1 below.

TABLE 1

|  |  | Example 1 | Example 2 | Example 3 | Comparative Example 1 | Comparative Example 2 | Comparative Example 3 | Comparative Example 4 | Example 4 | Comparative Example 5 |
|---|---|---|---|---|---|---|---|---|---|---|
| p-aminobenzoic acid | % by mole | 5 | 10 | 15 |  |  |  |  | 10 |  |
| p-aminophenol | % by mole |  |  |  |  | 5 | 2.5 | 5 |  |  |
| p-hydroxybenzoic acid | % by mole | 45 | 40 | 35 | 50 | 50 | 45 | 40 | 45 | 55 |
| 4,4'-dihydroxy-biphenyl | % by mole | 25 | 25 | 25 | 25 | 20 | 25 | 25 | 22.5 | 22.5 |
| Terephthalic acid | % by mole | 23.75 | 23.75 | 23.75 | 23.75 | 23.75 | 26.25 | 28.75 | 21.38 | 21.38 |
| Isophthalic acid | % by mole | 1.25 | 1.25 | 1.25 | 1.25 | 1.25 | 1.25 | 1.25 | 1.125 | 1.125 |
| Initial flowing temperature | ° C. | 385 | 385 | 383 | 385 | 387 | 385 | 382 | 386 | 382 |
| Deflection temperature under load | ° C. | 352 | 348 | 351 | 350 | 323 | 331 | 331 | 338 | 335 |
| Thick test piece |  |  |  |  |  |  |  |  |  |  |
| Tensile strength | Mpa | 121 | 137 | 158 | 112 | 122 | 134 | 117 | 150 | 112 |
| flexural strength | Mpa | 136 | 137 | 138 | 127 | 107 | 107 | 103 | 131 | 132 |
| flexural modulus | Mpa | 14900 | 13000 | 12600 | 12200 | 9900 | 9600 | 8900 | 11800 | 13500 |
| Thin Thickness test piece |  |  |  |  |  |  |  |  |  |  |
| Tensile strength MPa | 0.8 mm | 146 | 176 | 185 | 140 | 150 | 162 | 148 | 183 | 161 |
|  | 0.5 mm | 167 | 193 | 203 | 152 | 160 | 186 | 177 | 202 | 157 |
| flexural strength Mpa | 0.8 mm | 190 | 199 | 213 | 158 | 200 | 169 | 167 | 203 | 176 |
|  | 0.5 mm | 203 | 224 | 234 | 165 | 237 | 199 | 203 | 230 | 188 |
| flexural modulus MPa | 0.8 mm | 23400 | 25200 | 25200 | 21400 | 22500 | 18400 | 17600 | 23200 | 21300 |
|  | 0.5 mm | 25500 | 28500 | 2950 | 23000 | 24500 | 20000 | 20100 | 25500 | 22500 |

The present invention can provide an aromatic polyester amide which has improved mechanical strength and high elastic modulus after being molded into a thin wall article as well as exhibits excellent heat stability and moldability.

What is claimed is:

1. An aromatic polyester amide comprising the following repeating units (a)–(d):

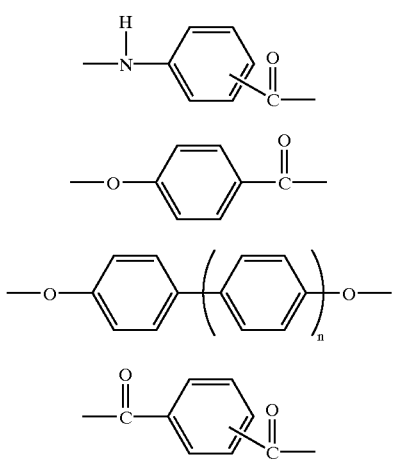

[wherein n in (c) represents 0 or 1]

wherein (a) is from 2 to 20% by mole, (b) is from 30 to 65% by mole, (c) is from 15 to 35% by mole and (d) is from 15 to 30% by mole provided that the sum of (a) to (d) is 100% by mole.

2. The aromatic polyester amide according to claim 1, wherein the repeating unit (c) is derived from 4,4'-dihydroxybiphenyl.

3. The aromatic polyester amide according to claim 1, wherein the repeating unit (a) is derived from p-aminocarboxylic acid.

4. A resin composition comprising an aromatic polyester amide according to claim 1, and inorganic filler, wherein the aromatic polyester amide is present at an amount of 50–95% by weight in the total resin composition.

5. A molded product obtained by injection-molding a resin composition according to claim 4.

\* \* \* \* \*